US011236694B2

(12) United States Patent
Lee et al.

(10) Patent No.: US 11,236,694 B2
(45) Date of Patent: Feb. 1, 2022

(54) INJECTOR ABNORMAL CYLINDER DIAGNOSIS METHOD AND INJECTOR ABNORMALITY DIAGNOSIS SYSTEM BASED ON SIGNAL DEVIATION

(71) Applicants: HYUNDAI MOTOR COMPANY, Seoul (KR); KIA MOTORS CORPORATION, Seoul (KR)

(72) Inventors: Seung-Hyun Lee, Suwon-si (KR); In-Soo Jung, Goyang-si (KR); Dong-Chul Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/110,506

(22) Filed: Dec. 3, 2020

(65) Prior Publication Data
US 2021/0381458 A1 Dec. 9, 2021

(30) Foreign Application Priority Data
Jun. 8, 2020 (KR) .......................... 10-2020-0069190

(51) Int. Cl.
*F02D 41/22* (2006.01)
*F02D 41/38* (2006.01)
(Continued)

(52) U.S. Cl.
CPC ......... *F02D 41/22* (2013.01); *F02D 41/1405* (2013.01); *F02D 41/1498* (2013.01);
(Continued)

(58) Field of Classification Search
CPC .. F02D 41/22; F02D 41/2474; F02D 41/1498; F02D 41/248; F02D 41/1405;
(Continued)

(56) References Cited

U.S. PATENT DOCUMENTS

| 4,271,469 A * | 6/1981 | Kawai | G01L 23/225 |
| | | | 701/111 |
| 4,895,121 A * | 1/1990 | McCoy | F02P 5/152 |
| | | | 123/406.13 |

(Continued)

FOREIGN PATENT DOCUMENTS

| GB | 2210688 A * | 6/1989 | .............. G01H 3/00 |
| JP | 59070879 A * | 4/1984 | ........... F02D 41/345 |

(Continued)

OTHER PUBLICATIONS

"Fault Detection of Fuel Injectors Based on One-Class Classifiers"; Journal Article retrieved from the internet: URLhttps://www.researchgate.net/publication/276046751_Fault_Detection_of_Fuel_Injectors_Based_on_One-Class_Classifiers (Year: 2014).*

*Primary Examiner* — Sizo B Vilakazi
*Assistant Examiner* — Brian R Kirby
(74) *Attorney, Agent, or Firm* — McDonnell Boehnen Hulbert & Berghoff LLP

(57) ABSTRACT

An injector failure cylinder diagnosis method based on signal deviation of an injector failure diagnosis system measures, by a controller, noise/vibration signals due to the combustion of an engine, separates an injector abnormal frequency band signal as an injector signal from the noise/vibration signals, divides cylinder number time series data, which use a signal maximum value of the noise/vibration signals as a cylinder #1, into segments, extracts a feature vector after confirming a segment number of the cylinder #1 with a vibration reduction signal of the noise/vibration signals re-measured using one of the cylinders as an idle cylinder and sorting it by injector causing vibration time series data, and confirms a failure injector with the feature vector, thereby independently diagnosing whether the injector for each cylinder is normal or abnormal considering the (Continued)

deviation of the noise/vibration signals between the injectors for each cylinder from the measured noise and vibration signals.

20 Claims, 10 Drawing Sheets

(51) Int. Cl.
  *F02D 41/14* (2006.01)
  *F02D 41/24* (2006.01)
(52) U.S. Cl.
  CPC ....... *F02D 41/248* (2013.01); *F02D 41/2474* (2013.01); *F02D 41/38* (2013.01); *F02D 2041/1432* (2013.01); *F02D 2041/224* (2013.01)
(58) Field of Classification Search
  CPC ............... F02D 41/38; F02D 2041/224; F02D 2041/1432; F02D 41/221; G07C 5/0833
  USPC .................................. 701/104, 107, 111, 114
  See application file for complete search history.

(56) References Cited

U.S. PATENT DOCUMENTS

| | | | | |
|---|---|---|---|---|
| 5,739,417 A | * | 4/1998 | Grob | F02D 41/28 73/35.03 |
| 5,864,055 A | * | 1/1999 | Borrione | F02D 41/221 73/35.09 |
| 5,945,596 A | * | 8/1999 | Burkel | F02D 41/221 73/114.38 |
| 6,275,765 B1 | * | 8/2001 | Divljakovic | G01M 15/05 701/102 |
| 8,099,231 B1 | * | 1/2012 | Suwa | F02D 41/221 701/111 |
| 2002/0148441 A1 | * | 10/2002 | Tuken | F02D 41/2451 123/436 |
| 2004/0003651 A1 | * | 1/2004 | Rauchfuss | G01L 23/225 73/35.07 |
| 2004/0050363 A1 | * | 3/2004 | Yamaoka | F02D 41/008 123/435 |
| 2004/0168677 A1 | * | 9/2004 | Mashiki | G01L 23/225 123/501 |
| 2004/0260453 A1 | * | 12/2004 | Sauler | G01L 23/225 701/111 |
| 2008/0133177 A1 | * | 6/2008 | Klenk | F02D 41/22 702/183 |
| 2008/0228341 A1 | * | 9/2008 | Orifij | G01M 15/12 701/31.4 |
| 2009/0199628 A1 | * | 8/2009 | Hartmann | F02D 41/3076 73/114.79 |
| 2011/0153182 A1 | * | 6/2011 | Sasaki | F02D 35/027 701/111 |
| 2015/0281838 A1 | * | 10/2015 | Hershey | G06K 9/00973 381/71.4 |
| 2016/0258378 A1 | * | 9/2016 | Bizub | G01L 23/221 |
| 2016/0298537 A1 | * | 10/2016 | Matthews | F02D 41/2464 |
| 2019/0353133 A1 | * | 11/2019 | Hakeem | F02D 13/06 |

FOREIGN PATENT DOCUMENTS

| | | | | |
|---|---|---|---|---|
| JP | 07238822 A | * | 9/1995 | ......... F02D 41/221 |
| JP | 2002122037 A | * | 4/2002 | |
| JP | 2004270631 A | * | 9/2004 | ............ F02D 41/22 |
| JP | 2020165378 A | * | 10/2020 | ............ F02D 41/22 |
| JP | 2020180605 A | * | 11/2020 | ............ F02D 45/00 |

* cited by examiner

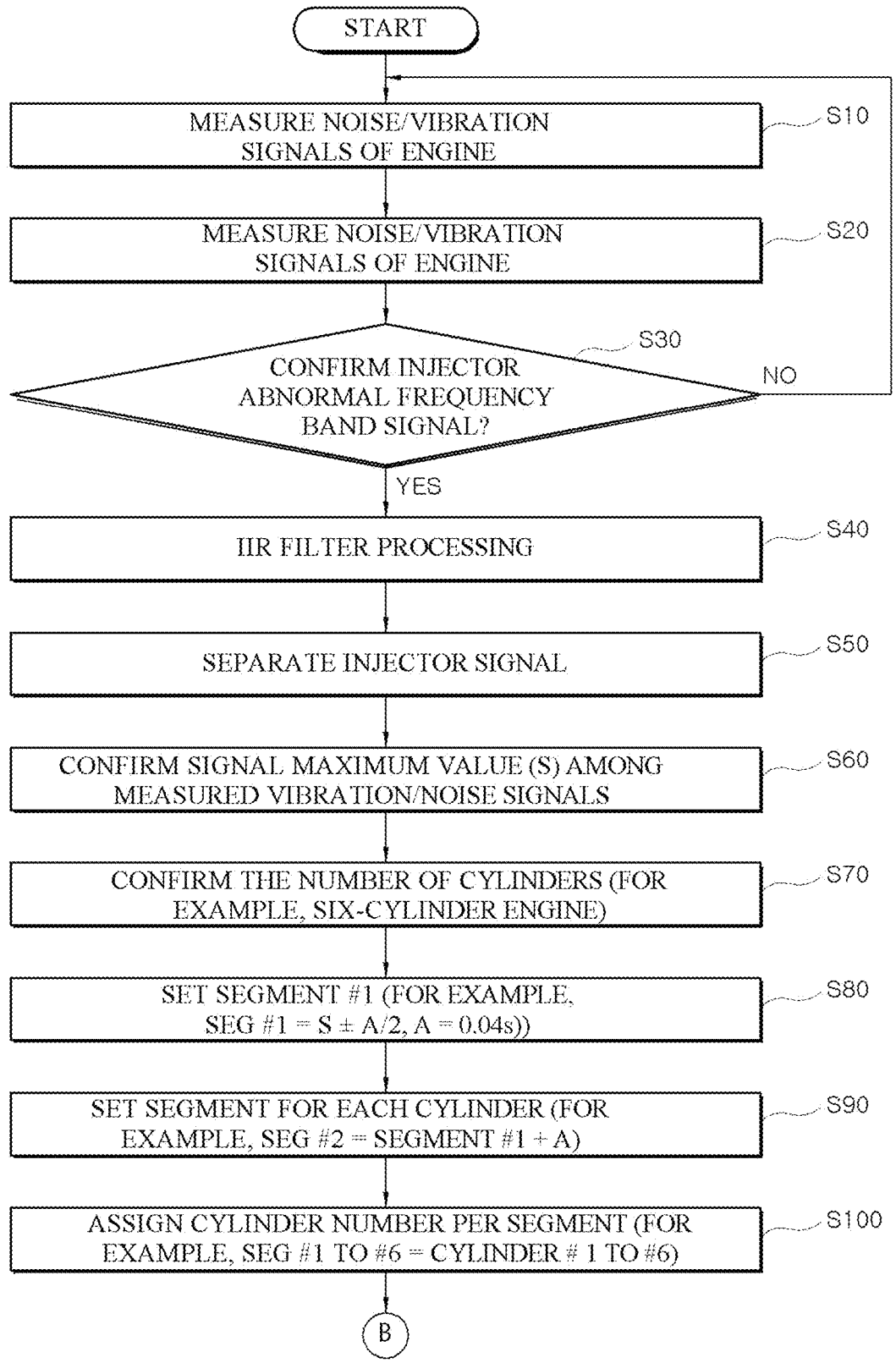

INJECTOR ABNORMAL CYLINDER DIAGNOSIS METHOD AND INJECTOR ABNORMALITY DIAGNOSIS SYSTEM BASED ON SIGNAL DEVIATION

CROSS REFERENCE TO RELATED APPLICATIONS

This application claims priority to Korean Patent Application No. 10-2020-0069190, filed on Jun. 8, 2020, which is incorporated herein by reference in its entirety.

BACKGROUND

Field of the Disclosure

The present disclosure relates to an injector abnormal cylinder diagnosis, and more particularly, to an injector abnormality diagnosis system, which may individually diagnose whether an individual injector is normal/abnormal by utilizing a deviation of noise/vibration signals of the injector for each cylinder.

Description of Related Art

Generally, an engine combustion control of a vehicle may determine whether abnormality currently occurs from noise/vibration signals generated in each cylinder (that is, a cylinder) of an engine, and determine a cylinder generating a major signal of abnormality.

Particularly, the engine combustion control may satisfy the aspects of stable combustion and combustion sound control in a combustion robustness control for disturbance conditions such as a high-compression ratio engine (for example, an internal combustion engine), environment, a usage fuel difference, and engine aging and thus is an example of an engine control technology of great importance.

As an example, an injector abnormal cylinder diagnosis control is one of the engine combustion control technologies, and applies a method of sensing and measuring noise/vibration in a specific frequency band according to the occurrence of the injector abnormality, separating a signal of the corresponding frequency band of the measured noise/vibration using a filter (for example, a band pass filter) or using a Fast Fourier Transform (FFT) analysis, setting a threshold capable of distinguishing a normal level and an abnormal level of the noise/vibration of the injector, and determining the injector as abnormality if the measured noise/vibration levels are the threshold or more utilizing a level comparison for the noise/vibration.

Accordingly, the injector abnormal cylinder diagnosis control is effective in diagnosing noise/vibration phenomena caused by the injector abnormality in an internal combustion engine.

However, the injector abnormal cylinder diagnosis control has the following limitations by using the level comparison for the noise/vibration.

First, it is impossible to accurately distinguish the corresponding cylinder in which abnormality occurs from all the cylinders when the abnormality of a plurality of cylinders is determined by comparing the levels of abnormal noise/vibration generated by the engine, so that it is inevitably impossible to diagnose each cylinder injector independently.

Second, since it is impossible to individually diagnose the abnormality of the injector, all injectors including the normal injector need to be replaced even if only one injector fails, thereby inevitably causing an excessive A/S cost due to the replacement of the injector.

Third, since it is impossible to distinguish and determine the normality and the abnormality determination thresholds even if they have different values with respect to the noise/vibration signals of each cylinder injector, it is necessarily difficult to perform the accurate diagnosis.

Fourth, it is difficult to determine the normality and the abnormality upon the maintenance of a vehicle causing the injector abnormal noise in a service center, and particularly, by determining the abnormal noise with listening by an inspector's views, it is necessarily difficult to perform the accurate diagnosis for the injector abnormality.

The contents described in Description of Related Art are to help the understanding of the background of the present disclosure, and may include what is not previously known to those skilled in the art to which the present disclosure pertains.

SUMMARY

Accordingly, an object of the present disclosure considering the above point is to provide an injector abnormal cylinder diagnosis method and an injector abnormality diagnosis system based on signal deviation, which may independently diagnose whether an injector for each cylinder is normal or abnormal in consideration of noise/vibration signal deviation between the injectors for each cylinder from measured noise and vibration signals, and particularly, accurately diagnose the abnormality of each of the injectors independently, thereby selectively replacing an abnormal injector upon engine inspection to reduce an A/S cost together while satisfying a customer service.

An injector abnormal cylinder diagnosis method according to the present disclosure for achieving the object includes separating, by a controller, an injector signal with respect to an injector abnormal frequency band signal indicating abnormality of an injector from noise/vibration signals due to the combustion of an engine, dividing cylinder number time series data, which uses a signal maximum value of the noise/vibration signals as a cylinder #1, into segments, and sorting injector causing vibration time series data by confirming a segment number using, as the cylinder #1, a vibration reduction signal of the noise/vibration signals measured in one idle cylinder state, extracting a feature vector with respect to each of the segments sorted by the injector causing vibration time series data, and confirming an abnormal injector by processing the feature vector based on AI or confirming the abnormal injector by processing the feature vector based on a threshold.

In an embodiment, the noise/vibration signals are measured during one-time combustion cycle of the engine, and are measured by an accelerometer which is attached to a measurement location where a signal-to-noise ratio (SN ratio) is the maximum in the engine.

In an exemplary embodiment, the separating of the injector signal includes measuring the noise/vibration signals, confirming the injector abnormal frequency band signal using the noise/vibration signals as raw data, and separating an injector signal indicating the abnormality of the injector by a filter processing using an IIR filer using a specific frequency range in kHz unit as a band-pass band.

In an exemplary embodiment, the sorting of the injector causing vibration time series data includes confirming the signal maximum value as a maximum value among signal magnitude values of the noise/vibration signals, confirming the number of cylinders of the engine, dividing the cylinder number time series data into the segments using, as a cylinder #1, a cylinder in which the signal maximum value is generated, and sorting the segments, and confirming an idle cylinder-based number which confirms the segment number by assigning the cylinder #1 to the idle cylinder in which the combustion causing vibration is reduced or confirming a sensor-based number which confirms the segment number by assigning the idle cylinder to the cylinder #1 in which a minimum signal of a crankshaft signal or a camshaft signal is generated.

In an exemplary embodiment, the sorting of the segment includes setting a segment #1 by applying ½ of the length of the segment assigned to the signal maximum value, setting a second segment according to the number of cylinders by increasing the length of the segment, and assigning a cylinder number by setting the segment #1 and the second segment.

In an exemplary embodiment, the confirming of the idle cylinder-based number includes setting the idle cylinder as the cylinder #1, deactivating the injector #1 of the idle cylinder, re-measuring the noise/vibration signals of the engine, sorting the re-measured noise/vibration signals with injector causing time series data, confirming a segment with a vibration minimum value which is the RMS minimum value among the RMS values of the vibration processed by a band-pass filter among the injector causing time series data as the segment of the idle cylinder due to the reduction in the combustion causing vibration, and numbering the segment using, as the cylinder #1, a cylinder in which a combustion causing vibration acceleration minimum value is generated.

In an exemplary embodiment, the confirming of the sensor-based cylinder number includes confirming a signal strength magnitude for the crankshaft signal or the camshaft signal, and confirming the segment number using, as the cylinder #1, a cylinder in which a minimum signal strength applied as a reference point among the signal strength magnitudes is generated.

In an exemplary embodiment, the extracting of the feature vector includes dividing the segments into segment units; setting the number of feature vectors for the segment units by being evenly applied to a group of the segment units, and applying an extracted feature vector as a feature vector for abnormality diagnosis by extracting the feature vector by the set number, which is n×100 or more (n is an integer of 1 or more), which may be diagnosed, with any one of a vibration maximum value, an RMS, a variance, a peak-to-peak, a kurtosis, and a crest factor.

In an exemplary embodiment, the confirming of the AI-based abnormal injector includes constructing a Deep Neural Network (DNN) model by extracting the feature vector as the feature vector for the abnormality diagnosis, and using the feature vector for the abnormality diagnosis as an input in an AI system, performing the AI using Machine learning or Deep learning with respect to the DNN model, determining, by the controller, the improvement in the accuracy of the DNN model using the output of the DNN model as the result of the DNN model, confirming the abnormal injector from the result of the DNN model, and outputting the abnormal injector confirmation as a diagnosis result.

In an exemplary embodiment, the confirming of the AI-based abnormal injector includes re-constructing the DNN model by increasing the number of feature vectors for the abnormality diagnosis extracted in response to the demand for the improvement in the accuracy of the DNN model.

In an exemplary embodiment, the confirming of the threshold-based abnormal injector includes performing, by a data mapper, cylinder mapping by sorting the time series data of the feature vector for each cylinder, matching the threshold for each cylinder with the cylinder mapping result; confirming, by the controller, an abnormal injector from the threshold matching result; and outputting the abnormal injector confirmation as the diagnosis result.

In addition, an injector abnormal diagnosis system according to the present disclosure for achieving the object includes a controller which measures noise/vibration signals due to the combustion of an engine, separates an injector abnormal frequency band signal as an injector signal from the noise/vibration signals, divides cylinder number time series data, which use a signal maximum value of the noise/vibration signals as a cylinder #1, into segments, extracts a feature vector after confirming a segment number of the cylinder #1 with a vibration reduction signal of the noise/vibration signals re-measured using one of the cylinders as an idle cylinder and sorting it by injector causing vibration time series data, and confirms an abnormal injector with the feature vector; and an accelerometer which is attached to a location where a highest S/N ratio is measured in the engine, and measures the noise/vibration signals.

In an exemplary embodiment, the controller is connected to an AI system which transfers an abnormal injector processing result of processing the feature vector based on AI to the controller or is connected to a data mapper which transfers an abnormal injector processing result of processing the feature vector based on a threshold to the controller.

In an exemplary embodiment, the controller includes: a data processing unit which measures the noise/vibration signals; a frequency separation unit which separates the injector signal; a time series data sorting unit which divides segments; a feature vector extraction unit which extracts the feature vector; and a diagnosis result determination unit which diagnoses the abnormal injector.

In an exemplary embodiment, the controller outputs an abnormal injector confirmation result as a signal to alert it to a diagnosis lamp.

The injector abnormal cylinder diagnosis method based on the signal deviation applied to the injector abnormality diagnosis system according to the present disclosure implements the following operations and effects.

First, by performing the injector abnormality diagnosis for each cylinder with the deviation of the noise/vibration signals for each injector of the cylinder, it is possible to perform the independent and individual abnormality diagnosis for each injector to which the conventional method for utilizing the comparison of the noise/vibration levels may not be applied even in the abnormal signal generated by the plurality of cylinders. Second, it is possible to accurately determine whether each cylinder injector is normal/abnormal only by measuring the noise/vibration of the engine in the service center by utilizing the signal deviation. Third, by independently diagnosing the injector for each cylinder, it is possible to selectively confirm only the injector confirmed as the abnormality or the failure by diagnosing the injector abnormality of the specific cylinder. Fourth, it is possible to selectively replace only the injector diagnosed as the abnormality, thereby reducing the A/S cost and satisfying the customer service compared to when all injectors are replaced without distinguishing the normality and the abnormality upon the A/S. Fifth, it is possible to perform the accurate diagnosis without the error of determining the abnormal noise with the listening by the inspector's views upon the maintenance of the vehicle which causes the injector abnormal noise in the service center.

BRIEF DESCRIPTION OF THE FIGURES

FIG. 1A, 1B and FIG. 2 are flowcharts of an injector abnormal cylinder diagnosis method based on signal deviation according to the present disclosure.

DETAILED DESCRIPTION

Hereinafter, an exemplary embodiment of the present disclosure will be described in detail with reference to the accompanying exemplary drawings, and the exemplary embodiment is an example and may be implemented in various different forms by those skilled in the art to which the present disclosure pertains, and thus is not limited to the exemplary embodiment described herein.

Figure 1B:
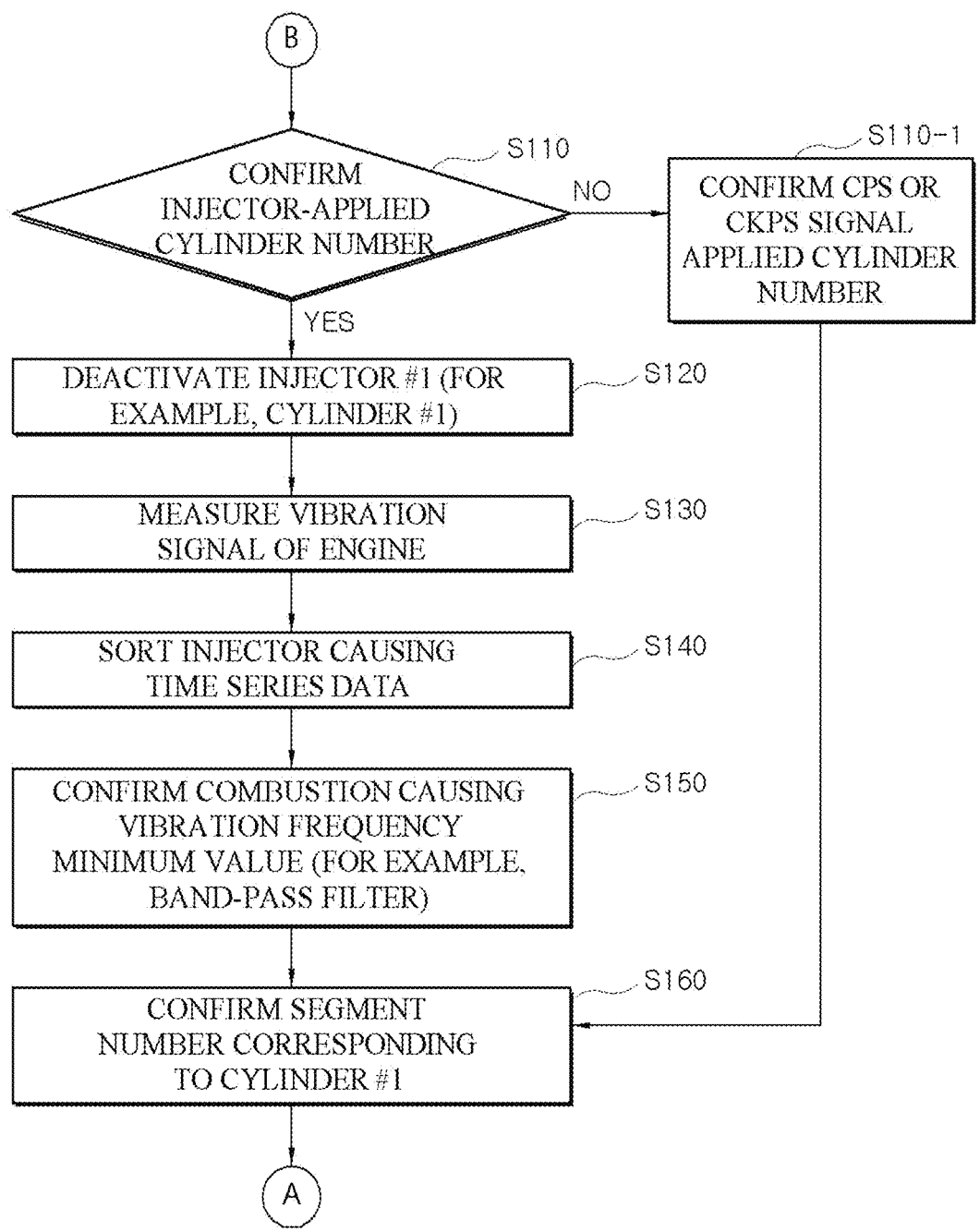
Figure 2:
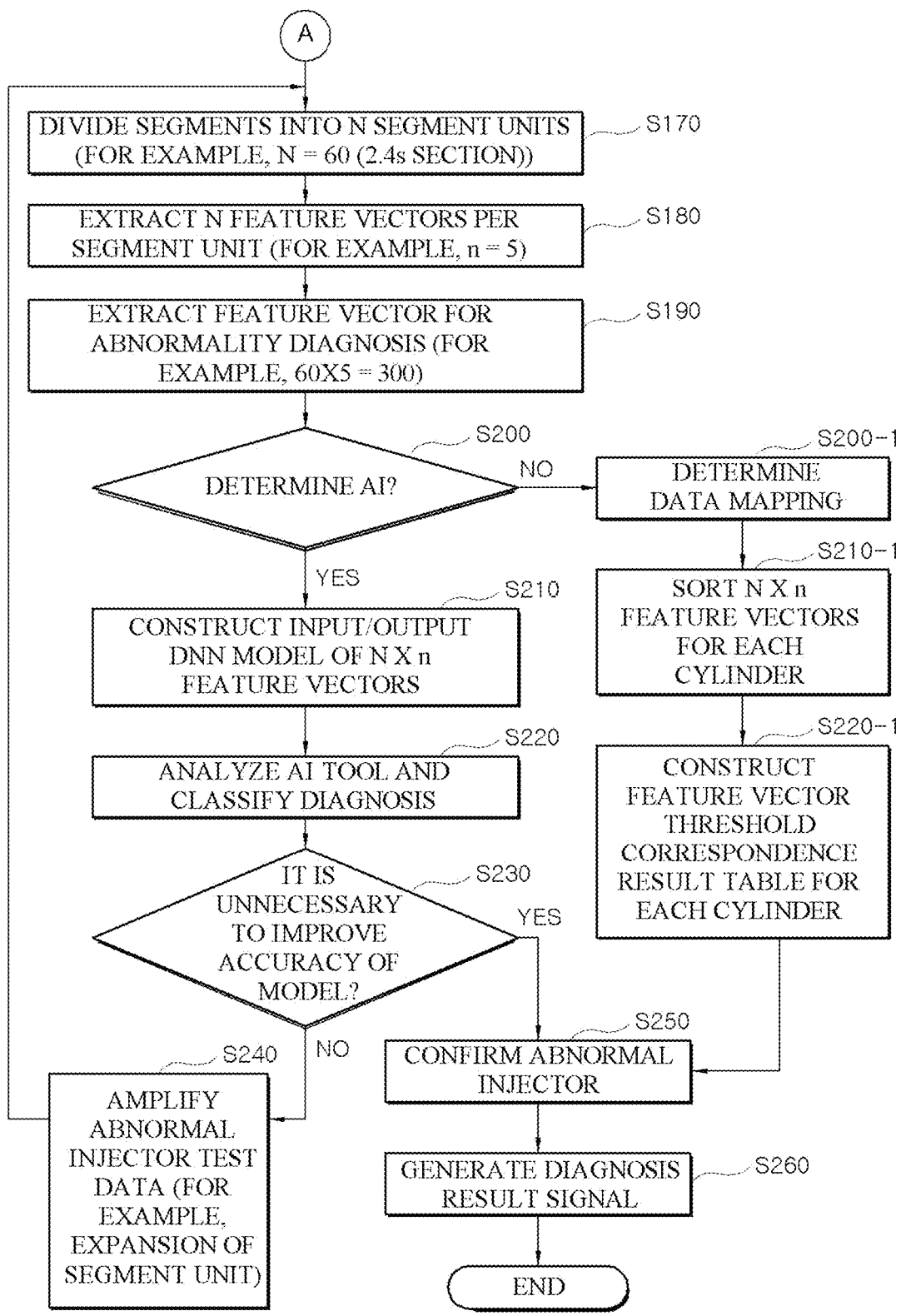

Referring to FIG. 1A, 1B and FIG. 2, an injector abnormal cylinder diagnosis method includes an injector abnormal data confirmation control (S10 to S50), an injector abnormal location confirmation control (S60 to S160), a feature vector extraction control (S170 to S190), an AI-based abnormal injector confirmation control (S200 to S260), and a threshold-based abnormal injector confirmation control (S200-1, S210-1, S220-1, S250, S260).

As an example, the injector abnormal data confirmation control (S10 to S50) separates an injector signal with respect to an injector abnormal frequency band signal indicating abnormality of an injector from noise/vibration signals generated by engine combustion.

As an example, the injector abnormal location confirmation control (S60 to S160) divides cylinder number time series data, which uses a signal maximum value of the noise/vibration signals as a cylinder #1, into segments, and sorts injector causing vibration time series data by assigning a segment number by setting a vibration reduction signal of the noise/vibration signals measured in one idle cylinder state as a segment #1. The feature vector extraction control (S170 to S190) extracts a feature vector for each of the segments sorted by the injector causing vibration time series data.

For example, the AI-based abnormal injector confirmation control (S200 to S260) confirms an abnormal injector by processing the feature vector with artificial intelligence (AI). On the other hand, the threshold-based abnormal injector confirmation control (S200-1, S210-1, S220-1, S250, S260) confirms an abnormal injector by applying the normal/abnormal determination thresholds to the feature vector.

Accordingly, the injector abnormal cylinder diagnosis method may determine whether the injector for each cylinder fails by independently diagnosing whether the injector for each cylinder is normal/abnormal and improve diagnosis accuracy considering the noise/vibration signal deviation of the injector for each cylinder, thereby eliminating all the problems in that it is impossible to independently diagnose the injector due to the impossibility of distinguishing the abnormality occurrence cylinder and it is difficult to perform the accurate diagnosis due to the difference between the normal/abnormal determination thresholds having the difference between the injector characteristics for each cylinder.

Accordingly, the injector abnormal cylinder diagnosis method may be characterized as the injector abnormal cylinder diagnosis method based on the signal deviation using a specific frequency band for independently diagnosing abnormality of the injector for each cylinder.

Figure 3:
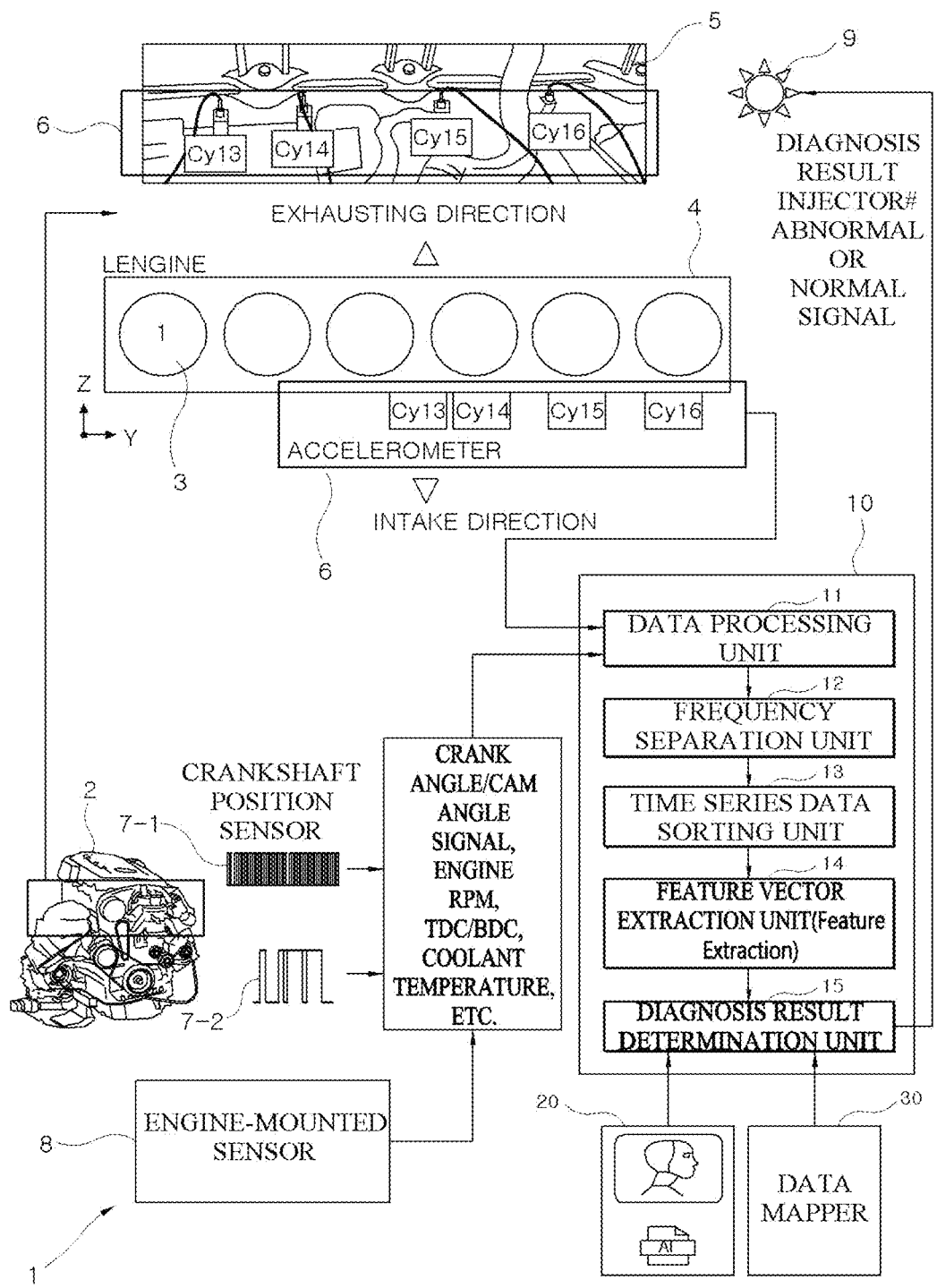
FIG. 3 is a diagram illustrating an example of an injector abnormality diagnosis system in which an injector abnormal cylinder diagnosis control based on signal deviation according to the present disclosure is implemented.

Meanwhile, FIG. 3 is an example of an injector abnormality diagnosis system 1, and the injector abnormality diagnosis system 1 includes an engine 2, sensors 6, 7-1, 7-2, 8, a diagnosis lamp 9, a controller 10, an artificial intelligence (AI) system 20, and a data mapper 30.

Specifically, the engine 2 is an internal combustion engine, and classified into a cylinder block 4 forming a combustion chamber with six cylinders 3 and having a crankshaft connected to a piston and a cylinder head 5 having a valve system driven by a camshaft. Accordingly, the engine 2 is a general six-cylinder engine. However, the six-cylinder engine is only one example, and may also be less than the six cylinders or the six cylinders or more.

Specifically, the sensors 6, 7-1, 7-2, 8 are composed of an accelerometer 6, a crank position sensor 7-1, a cam position sensor 7-2, and an engine-mounted sensor 8.

As an example, one accelerometer 6 is configured, and measures noise/vibration together with a microphone (not illustrated) which measures the overall noise generated by the engine. Accordingly, one accelerometer 6 is attached to some cylinders (for example, four cylinders) among the plurality of cylinders 3 which are at a location where vibration may be best detected using a rib structure of the cylinder block 4 or the cylinder head 5.

Table 1 below shows a comparison state of the injector signal detection performance according to the accelerometer location using the structural analysis simulation.

TABLE 1

Injector signal detection performance according to accelerometer location

| | | Measurement location | | | | | |
|---|---|---|---|---|---|---|---|
| | | Cyl4 | | Cyl5 | | Cyl6 | |
| | | X | Z | X | Z | X | Z |
| Wear injector | #4 | E | E | E | G | P | P |
| | #5 | G | G | E | E | G | G |
| | #6 | P | P | G | G | E | E |

E: Excellent
P: Poor
G: Good

From Table 1, the accelerometer 6 selects, as an attachment portion, a measurement location having the highest signal-to-noise ratio (S/N ratio) (a ratio of signal amount (S) and noise amount (N) among the observed signals) in the engine 2, and for example, a location where the abnormality of the injectors #4 to 6 may be best found is illustratively selected by the X direction (up and down of the engine) and the Z direction (block normal direction) of the fifth cylinder.

As described above, the accelerometer 6 is attached to the measurement location where the signal-to-noise ratio (S/N ratio) is the maximum in the engine 2, so that even if one accelerometer 6 is configured, sufficient data necessary for analysis may be obtained.

However, the accelerometer 6 may be composed of two or more accelerometers for higher accuracy even if the computational amount between the accelerometers complexly increases.

As an example, the crank position sensor 7-1 detects a signal for rotation of the crankshaft at the cylinder block 4 side. The cam position sensor 7-2 detects a signal for the rotation of the cam shaft at the cylinder head 5 side. The engine-mounted sensor 8 is attached to the engine 2 as a coolant temperature sensor, an outside air temperature sensor, an engine RPM sensor (or a revolution per minute sensor), an air pressure sensor, or the like to detect engine information.

Specifically, the diagnosis lamp 9 is a lamp or a light-emitting diode (LED) installed on a driver cluster, and turned on by a signal of a controller 10 for the abnormality or the normality of the injector #, as the diagnosis result, thereby informing a driver of a specific injector in which the abnormality occurs.

Specifically, the controller 10 receives detection signals of the accelerometer 6, the crank position sensor 7-1, the cam position sensor 7-2, and the engine-mounted sensor 8, particularly sets the noise measured around the injector by the accelerometer 6 as an injector causing noise, and classifies the noise measured by a microphone (not illustrated) including all kinds of miscellaneous noises within the engine 2 as engine noise.

To this end, the controller 10 is composed of a data processing unit 11, a frequency separation unit 12, a time series data sorting unit 13, a feature vector extraction unit 14, and a diagnosis result determination unit 15.

At this time, the controller 10 processes the input noise/vibration data by the data processing unit 11→the frequency separation unit 12→the time series data sorting unit 13→the feature vector extraction unit 14→the diagnosis result determination unit 15, or the data processing unit 11→the time series data sorting unit 13→the frequency separation unit 12→the feature vector extraction unit 14→the diagnosis result determination unit 15. The reason is that the extraction result of the feature vector is the same even if the noise/vibration data are frequency-separated and then sorted by the time series data or sorted by the time series data and then frequency-separated. Here, "→" indicates a proceeding sequence of the data processing procedure.

As an example, the data processing unit 11 performs measuring noise/vibration (S10 and S20) to detect noise/vibration data in the block 4 or the head 5. The frequency separation unit 12 performs separating a frequency (S30 to S50) to separate a signal in a specific frequency band in which the abnormality of the injector occurs using the noise/vibration data as a vibration/noise raw signal. The time series data sorting unit 13 determines a sequence number for the cylinder 3 of the engine 2 by sorting the time series data of the segment (for example, six cylinders→six segments) according to an event (that is, combustion) time point with respect to the vibration/noise signals measured by performing the injector abnormal location confirmation control (S60 to S160).

As an example, the feature vector extraction unit 14 performs the feature vector extraction control (S170 to S190) to confirm basic data for distinguishing the normality/abnormality of the injector from the feature vector obtained from noise/vibration signals for each segment sorted by the time series data.

As an example, the diagnosis result determination unit 15 confirms whether the injector is normal/abnormal according to the artificial intelligence (AI) processing result for the feature vector obtained by performing the AI-based abnormal injector confirmation control (S200 to S260) or the threshold-applied result of the data mapper 30 for the feature vector obtained by performing the threshold-based abnormal injector confirmation control (S200-1, S210-1, S220-1, S250, S260), stores the confirmed result in an On Board Diagnosis (OBD), and outputs the confirmed result to the diagnosis lamp 9. Particularly, the diagnosis result determination unit 15 may have a Deep Neural Network (DNN) model, Machine learning, and Deep learning of an AI system 20 embedded as abnormality diagnosis analysis tools.

Accordingly, the controller 10 has a memory storing logics or programs for the measuring of the noise/vibration (S10, S20), the separating of the frequency (S30 to S50), the injector abnormal location confirmation control (S60 to S160), the feature vector extraction control (S170~S190), the AI-based abnormal injector confirmation control (S200 to S260), and the threshold-based abnormal injector confirmation control (S200-1, S210-1, S220-1, S250, S260), and is operated by a central processing unit.

Specifically, the AI system 20 configures the Deep Neural Network (DNN) model which uses the feature vector as an input in order to determine the normality/abnormality of the injector and uses the diagnosis classification result of each injector as an output, and outputs and provides to the diagnosis result determination unit 15 of the controller 10 the feature vector processing result utilizing the Machine learning or Deep learning for determining whether the injector is normal/abnormal. Then, the diagnosis result determination unit 15 confirms whether the injector is normal/abnormal using the output of the AI system 20 to store the confirmed result in the On Board Diagnosis (OBD) and outputs the confirmed result to the diagnosis lamp 9.

Particularly, the AI system 20 may also configure a Convolution Neural Network (CNN) model.

Specifically, the data mapper 30 sorts the feature vectors in time series for each cylinder using a determination algorithm and then outputs the feature vector result with different normal/abnormal determination thresholds for each cylinder to provide the feature vector result to the diagnosis result determination unit 15 of the controller 10. Then, the diagnosis result determination unit 15 confirms whether the injector is normal or abnormal with the output of the data mapper 30 to store the confirmed result in the On Board Diagnosis (OBD) and outputs the confirmed result to the diagnosis lamp 9.

Accordingly, the diagnosis result determination unit 15 of the controller 10 may be configured to confirm whether the injector is normal/abnormal and to output the confirmed result by performing the AI-based abnormal injector confirmation control (S200 to S250) connected with the AI system 20 or performing the threshold-based abnormal injector confirmation control (S200-1, S210, S210-1, S220, S220-1, S250) connected with the data mapper 30.

Hereinafter, the injector abnormal cylinder diagnosis method based on signal deviation illustrated in FIG. 1A, 1B and FIG. 2 will be described in detail with reference to FIGS. 3 to 8. In this case, the control subject is the controller 10, and the control object is the injector abnormality diagnosis system 1.

First, the controller 10 performs the injector abnormal data confirmation control (S10 to S50). Particularly, the injector abnormal data confirmation control (S10 to S50) obtains noise/vibration data in the block or the head of the engine in the measuring of the noise/vibration (S10, S20), and separates a signal in a specific frequency band in which the abnormality of the injector occurs using sets the noise/vibration data as the noise/vibration raw data signal in the separating of the frequency (S30 to S50).

Referring to FIG. 3, the controller 10 confirms the noise/vibration signals, which are detected from the accelerometer 6 attached to each of CYL #3, CYL #4, CYL #5, CYL #6 which are four cylinders of the six cylinders 3 of the engine 2 and the microphone, in the data processing unit 11, and processes the measured noise/vibration signals with the raw data of the noise/vibration signal in the frequency separation unit 12. In this case, the noise/vibration signal is measured by the cylinder block 4 or the cylinder head 5.

Accordingly, the injector abnormal data confirmation control (S10 to S50) includes measuring the noise/vibration signals in the engine (S10), performing the raw data analysis with respect to the noise/vibration signals (S20), confirming the injector abnormal frequency band signal (S30), performing a filter processing (for example, an infinite impulse response (IIR) filter) for the injector abnormal frequency band signal (S40), and separating an injector signal (for example, band-pass: 2.5 to 3 kHz) in a specific frequency range in kHz unit indicating the abnormality of the injector by the filter processing (S50).

Figure 4:
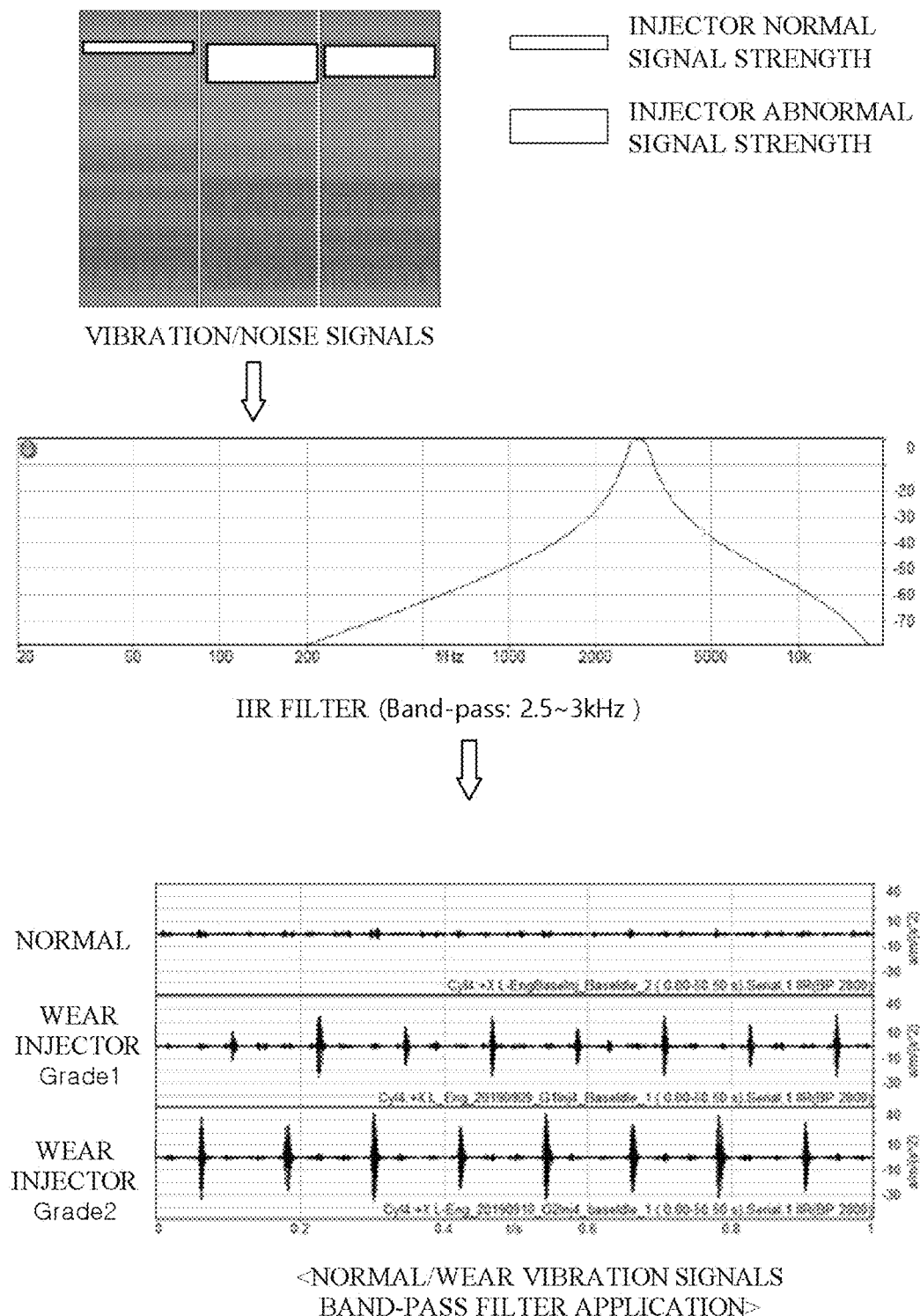
FIG. 4 is a diagram illustrating an example of separating a signal in a frequency band in which abnormal injector characteristics are greatest from vibration/noise raw data measured utilizing an IIR filter according to the present disclosure.

Referring to FIG. 4, the injector abnormal signal is illustrated by the vibration/noise signal frequency analysis, the IIR filter processing, and the IIR filter processing results.

As an example, the vibration/noise signal frequency analysis shows that the injector abnormal signal strength has the relatively increased level of the specific frequency range in kHz unit, compared to the injector normal signal strength. In addition, the IIR filter processing shows that in a specific frequency range in kHz unit, the injector abnormal frequency band is separated as the injector abnormal signal from the raw data signal through the band-pass of the IIR filter. In addition, the result of the IIR filter processing shows that the IIR filter processing vibration signal strengths of wear injector Grades #1, 2 are stronger than the IIR filter processing vibration signal strength of the normal injector. Particularly, it may be seen that the wear injector has the stronger IIR filter processing vibration signal strength in the wear injector Grade #2, which has a higher degree of wear than that of the wear injector Grade #1.

Subsequently, the controller 10 performs the injector abnormal location confirmation control (S60 to S160). Particularly, the injector abnormal location confirmation control (S60 to S160) determines the sequence numbers for the plurality of cylinders 3 configuring the engine 2 by the time series data sorting (for example, six cylinders→six segments) of the segment according to the time point of the event (that is, the combustion for each cylinder 3).

Referring to FIG. 3, the controller 10 processes the injector abnormal frequency band signal result according to the injector signal separation of the frequency separation unit 12 in the time series data sorting unit 13.

Specifically, the injector abnormal location confirmation control (S60 to S160) includes confirming a signal maximum value from the measured vibration/noise signals (S60), confirming the number of cylinders (S70), sorting the segments (S80 to S100), confirming an idle cylinder based number in which a segment number corresponding to the cylinder #1 is confirmed by confirming the injector-applied cylinder number (S110 to S160), or confirming a sensor-based number in which the segment number corresponding to the cylinder #1 is confirmed by a crankshaft signal or a camshaft signal (S110-1, S160).

As an example, the confirming of the signal maximum value from the measured vibration/noise signals (S60) is confirmed as the maximum value of the vibration/noise signals measured during one cycle combustion of the engine 2. The confirming of the number of cylinders (S70) is confirmed as six cylinders in the case of the six-cylinder engine 2.

Figure 5:
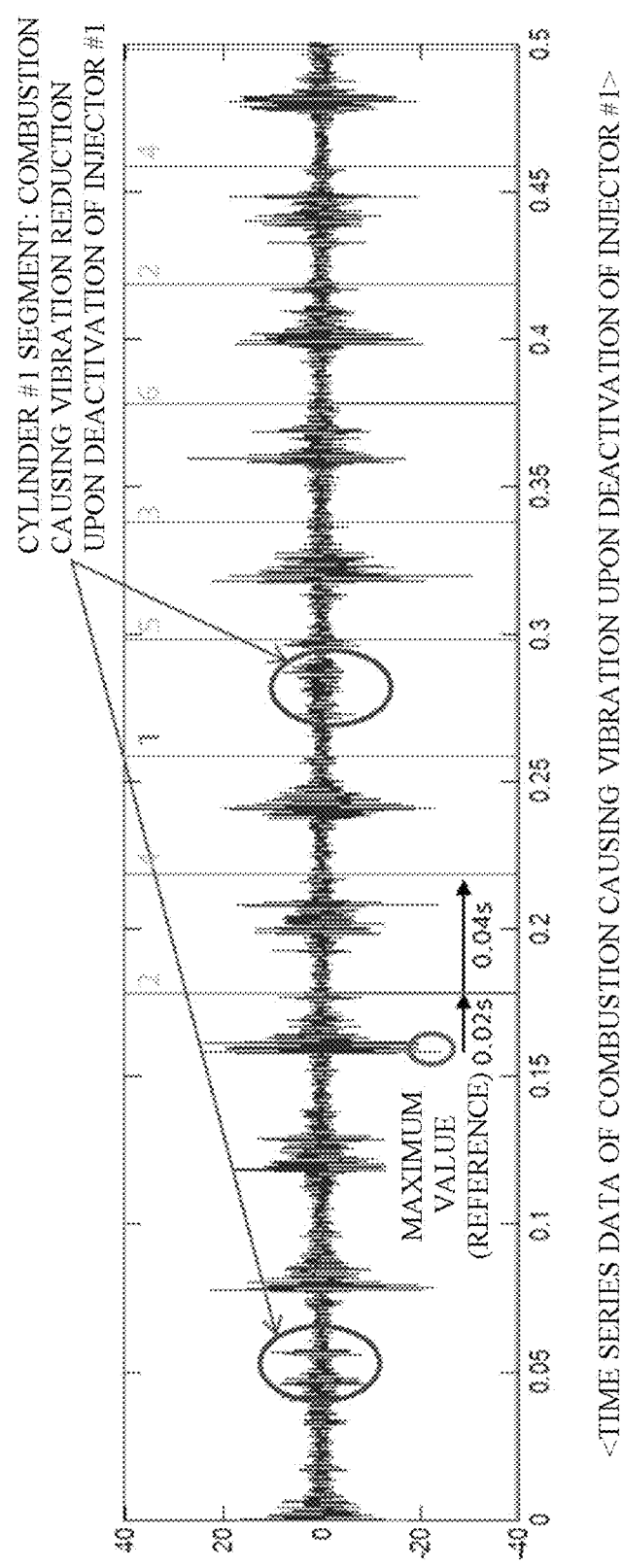
FIG. 5 is a diagram illustrating an example of dividing segments and confirming a cylinder number in an injector deactivation method according to the present disclosure.

Referring to FIG. 5, the controller 10 confirms the strongest signal strength among the vibration/noise signals measured during one cycle of the six-cylinder engine 2 as the signal maximum value to set it as a reference value.

As an example, the sorting of the segments (S80 to S100) includes setting the segment #1 (S80), setting segments #2 to #6 for the six cylinders 3 (S90), and assigning the cylinder number for each segment (S100).

Referring to FIG. 5, the controller 10 determines, as the signal maximum value, a case where an RMS value of the vibration is the largest among the vibration/noise signals measured during one cycle of the six-cylinder engine 2 from the injector causing vibration time series data, and sets a length (A) of the segment for the signal maximum value as 0.04 S to set lengths of the second to sixth segments of the six cylinders 3 as A/2=±0.02 s.

Accordingly, the setting of the segment #1 (S80) sets the length (A) of the segment for the signal maximum value as A/2±0.02 s, and the setting of the segments #2 to #6 (S90) sets each length thereof as follows.

That is, the length of the segment #2=A/2+A, the length of the segment #3=A/2+2A, the length of the segment #4=A/2+3A, the length of the segment #5=A/2+4A, the length of the segment #6=A/2+5A.

Accordingly, the assigning of the cylinder number for each segment (S100) assigns the length of the segment #1=0.02, the length of the segment #2=0.06, the length of the segment #3=0.10, the length of the segment #4=0.14, the length of the segment #5=0.18, and the length of the segment #6=0.22.

Accordingly, the sorting of the segments (S80 to S100) divides the noise/vibration measured from the combustion stop of the cylinder #1 and the combustion of the cylinders #2 to #6 into the segments #1 to #6 to obtain the RMS value of the vibration by the band-pass filter processing, and reflects the combustion causing vibration caused by stopping the fuel injection of the injector to the minimum value of the smallest RMS among the RMS values corresponding to the segments #1 to #6 to clearly confirm the segment having the RMS minimum value among the segments #1 to #6 as the segment corresponding to the cylinder #1.

As a result, the sorting of the segments (S80 to S100) accurately divides and determines the cylinders #1 to #6 with respect to the segments #1 to #6.

As an example, the confirming of the idle cylinder-based number (S110 to S160) includes confirming the injector-applied cylinder number (S110), deactivating an injector #1 (S120), measuring the vibration signal of the engine due to the deactivation of the injector #1 (S130), sorting the injector causing time series data (S140), confirming a combustion causing vibration acceleration minimum value (S150), and confirming the corresponding segment number of the cylinder #1 to which the deactivation of the injector #1 is applied (S160).

That is, the sorting of the segments (S80 to S100) is based on that the stop of the fuel injection of the injector #1, which is the corresponding injector, due to the cylinder combustion deactivation (that is, switch to the idle cylinder) of the cylinder #1 arbitrarily set as the cylinder #1 among the cylinders #1 to #6 causes the reduction in the vibration of the engine 2, and the reduction in the engine vibration is defined as the combustion causing vibration reduction, so that the influence of the injector on the engine vibration may be seen. Accordingly, the idle cylinder in which the combustion causing vibration is reduced is assigned as the cylinder #1 and thus the segment number is confirmed.

Meanwhile, the confirming of the sensor-based number (S110-1, S160) includes confirming the segment number corresponding to the cylinder #1 by applying a CPS or CKPS signal (S110-1) and confirming the segment number corresponding to the cylinder #1 to which the #1 injector deactivation is applied (S160).

The "combustion causing vibration reduction" described below means that the vibration due to combustion is reduced by having no fuel injection of the corresponding injector in the idle cylinder, thereby proving that the cylinder #1 may be confirmed among the plurality of cylinders.

Figure 6:
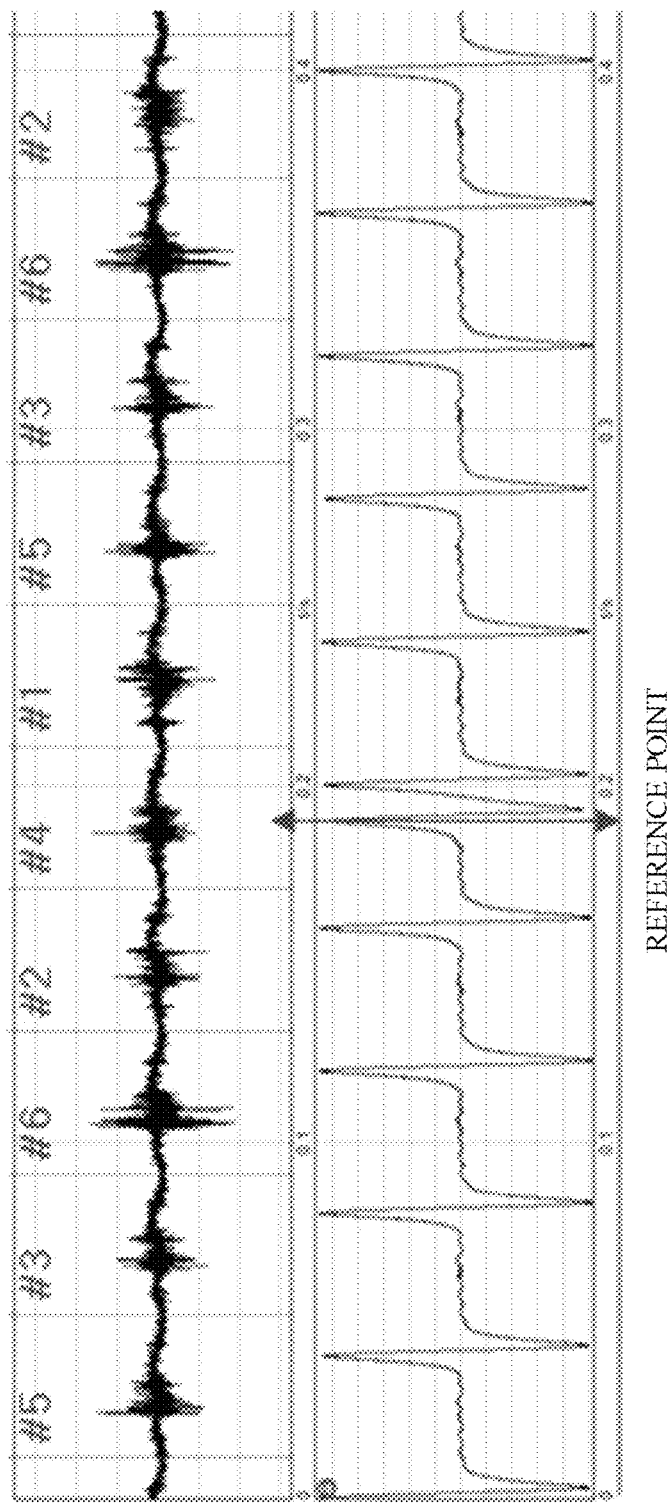
FIG. 6 is a diagram illustrating an example of dividing the segments and confirming the cylinder number utilizing a CPS signal or a CKPS signal instead of the injector deactivation method according to the present disclosure.

Referring to FIG. 6, the controller 10 stops the fuel injection of the injector #1, which is the corresponding injector, according to the cylinder combustion deactivation of the cylinder #1 arbitrarily determined as the cylinder #1 among the cylinders #1 to #6 and then confirms the crankshaft location signal of the crank position sensor 7-1 or the crankshaft location signal of the camshaft location signal of the camshaft sensor 7-2 during one cycle of the six-cylinder engine 2, from the injector causing vibration time series data.

Then, the controller 10 confirms the weakest signal strength reflecting the combustion causing vibration caused by stopping the fuel injection of the injector from the signal strengths of the segments #1 to #6 represented by the crankshaft location signal or the camshaft location signal.

Accordingly, the confirming of the sensor-based cylinder number (S110-1, S160) may confirm the cylinder #4 of the segment #4 as the cylinder #1 arbitrarily set using the segment #4 indicating the minimum signal strength as a reference point.

Subsequently, the controller 10 performs the feature vector extraction control (S170 to S190). Particularly, the feature vector extraction control (S170 to S190) confirms basic data for distinguishing the normality/abnormality of the injector from the feature vectors obtained from the noise/vibration signals for each segment sorted by the time series data.

As an example, the feature vector extraction may apply any one of a maximum vibration value, a root mean square (RMS), a variance, a peak-to-peak, a kurtosis, and a crest factor.

In this case, the RMS refers to the output which may be consecutively generated by the amplifier as the square root of a value obtained by averaging the square of the instantaneous value of the waveform signal during one cycle. The variance refers to the numerical value of the degree to which the measured values of the population are scattered as the average of the squares of the deviations of the measured values. The peak-to-peak refers to the magnitude of the waveform from a positive crest value to a negative crest value. The kurtosis refers to a criterion indicating the degree of flatness of the probability distribution for certain variables. The crest factor means a ratio of the crest (peak, maximum) value to the effective value of the periodic function.

Specifically, the feature vector extraction control (S170 to S190) includes dividing the segment into segment units (S170), setting a feature vector (S180), and extracting a feature vector for abnormality diagnosis (S190).

Figure 7:
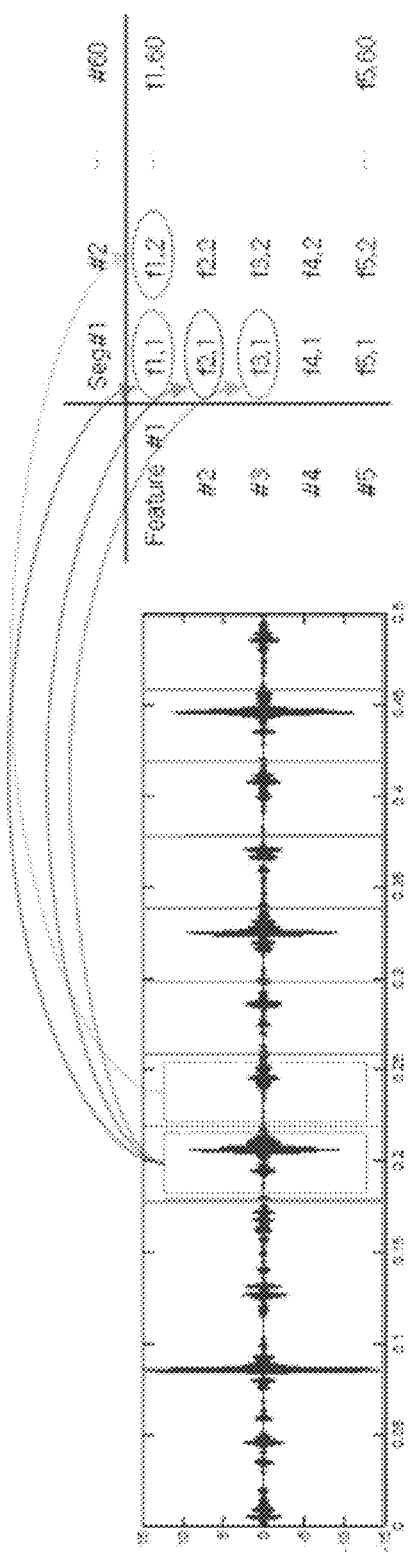
FIG. 7 is a diagram illustrating an example of a feature vector extraction according to the present disclosure.

Referring to FIG. 7, the controller 10 divides the segments into segment units in which one or more feature vectors are used to increase diagnosis accuracy with respect to the injector causing vibration time series data illustrated in FIGS. 5 and 6, and confirms the abnormal characteristics from the feature vector extracted from the segment unit in the feature vector extraction unit 14.

Accordingly, the dividing of the segment into the segment units (S170) divides the segments into the N segment units, the setting of the feature vector (S180) sets n feature vectors per the segment unit with any one of the maximum vibration value, the crest factor, the RMS, the variance, the Max, the peak-to-peak, and the kurtosis, and the extracting of the feature vector for the abnormality diagnosis (S190) extracts the N×n feature vectors for the abnormality diagnosis with respect to the segments (segments #1 to #6) of the injector causing vibration time series data.

For example, the N refers to the number of segment units and is set as 60 in the 2.4 s section of the segments (segments #1 to #6), and the n is set as 5 as the number of features in the feature vector. Accordingly, the feature vector for the abnormality diagnosis is extracted as 60×5=300.

Finally, the controller 10 performs the AI-based abnormal injector confirmation control (S200 to S260) or the threshold-based abnormal injector confirmation control (S200-1, S210-1, S220-1, S250, S260).

As an example, the AI-based abnormal injector confirmation control (S200 to S250) may determine whether the injector is normal/abnormal utilizing the Machine learning model learning or the Deep learning model learning for the features of the feature vector, and particularly, utilize the learning by a data amplification method for improving the accuracy of the model.

Specifically, the AI-based abnormal injector confirmation control (S200 to S260) includes applying the AI (S200), constructing the Deep Neural Network (DNN) model (S210), performing the AI (S220), confirming the accuracy of the DNN model (S230), re-constructing the DNN model (S240), confirming the abnormal injector (S250), and generating the diagnosis result signal (S260).

Figure 8:
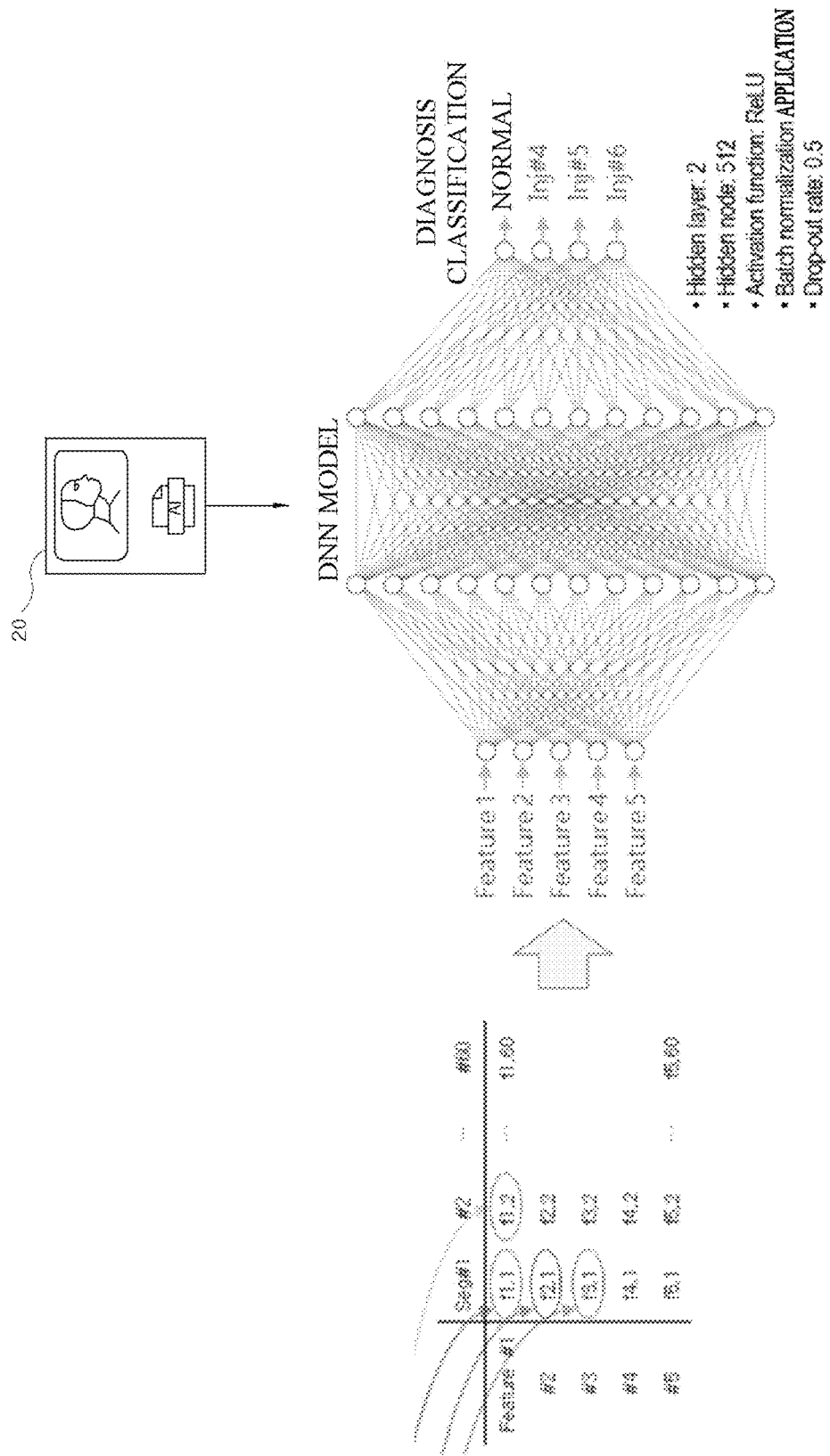
FIG. 8 is a diagram illustrating an example of a method for utilizing an artificial intelligence system which performs an abnormality diagnosis for each cylinder capable of learning a Machine learning or Deep learning model by configuring a DNN model with a feature vector aligned for each cylinder according to the present disclosure.

Referring to FIG. 8, the controller 10 is interlocked with the AI system 20 through the diagnosis result determination unit 15.

As an example, the constructing the DNN model (S210) transfers n×100 or more (n is an integer of 1 or more) (for example, 300 (N×n)) feature vectors which may be diagnosed by the feature vector extraction unit 14 according to the applying of the AI (S200) as an input of the AI system 20, and the AI system 20 constructs the DNN model with n×100 or more feature vectors which may be diagnosed. The performing of the AI (S220) uses the feature vector processing result as the output of the DNN model utilizing the Machine learning or the Deep learning. The confirming of the accuracy of the DNN model (S230) receives the result of the DNN model through the output of the DNN model by the diagnosis result determination unit 15, and analyzes the result of the DNN model to confirm the necessity of improving the accuracy of the DNN model and then switch to the re-constructing of the DNN model (S240) or enters into confirming the abnormal injector (S250).

As an example, the re-constructing of the DNN model (S240) is a case where it is necessary to improve the accuracy of the DNN model because it is unclear to confirm the abnormal injector with the result of the DNN model in the diagnosis result determination unit 15, and returns to the feature vector extraction control (S170 to S190) for amplifying the abnormal injector test data to increase the number of feature vectors for the abnormality diagnosis extracted (S190) and then performs the AI-based abnormal injector confirmation control (S200 to S260) again.

On the other hand, the confirming of the abnormal injector (S250) is a case where the abnormal injector is clearly confirmed with the result of the DNN model in the diagnosis result determination unit 15.

As an example, the generating of the diagnosis result signal (S260) distinguishes the normal injector and the abnormal injector among the injectors #1 to #6 corresponding to the cylinders #1 to #6 in the diagnosis result determination unit 15, stores the abnormal injector in the On Board Diagnosis (OBD), and outputs it to the diagnosis lamp 9.

Referring to FIG. 3, the controller 10 turns on the diagnosis lamp 9 with the abnormal injector # signal or the normal injector # signal with respect to the output of the diagnosis result of the diagnosis result determination unit 15 to notify the driver or the inspector of the abnormal injector result.

On the other hand, the threshold-based abnormal injector confirmation control (S200-1, S210-1, S220-1, S250, S260) sorts the feature vectors in the time series for each cylinder and then utilizes the determination algorithm in which the normal/abnormal determination threshold is assigned to each feature for each cylinder to confirm whether the injector is normal/abnormal.

Specifically, the threshold-based abnormal injector confirmation control (S200-1, S210-1, S220-1, S250, S260) includes performing data mapping (S200-1), matching the feature vector with the cylinder (S210-1), constructing a threshold correspondence result table (S220-1), confirming the abnormal injector (S250), and generating the diagnosis result signal (S260).

Figure 9:
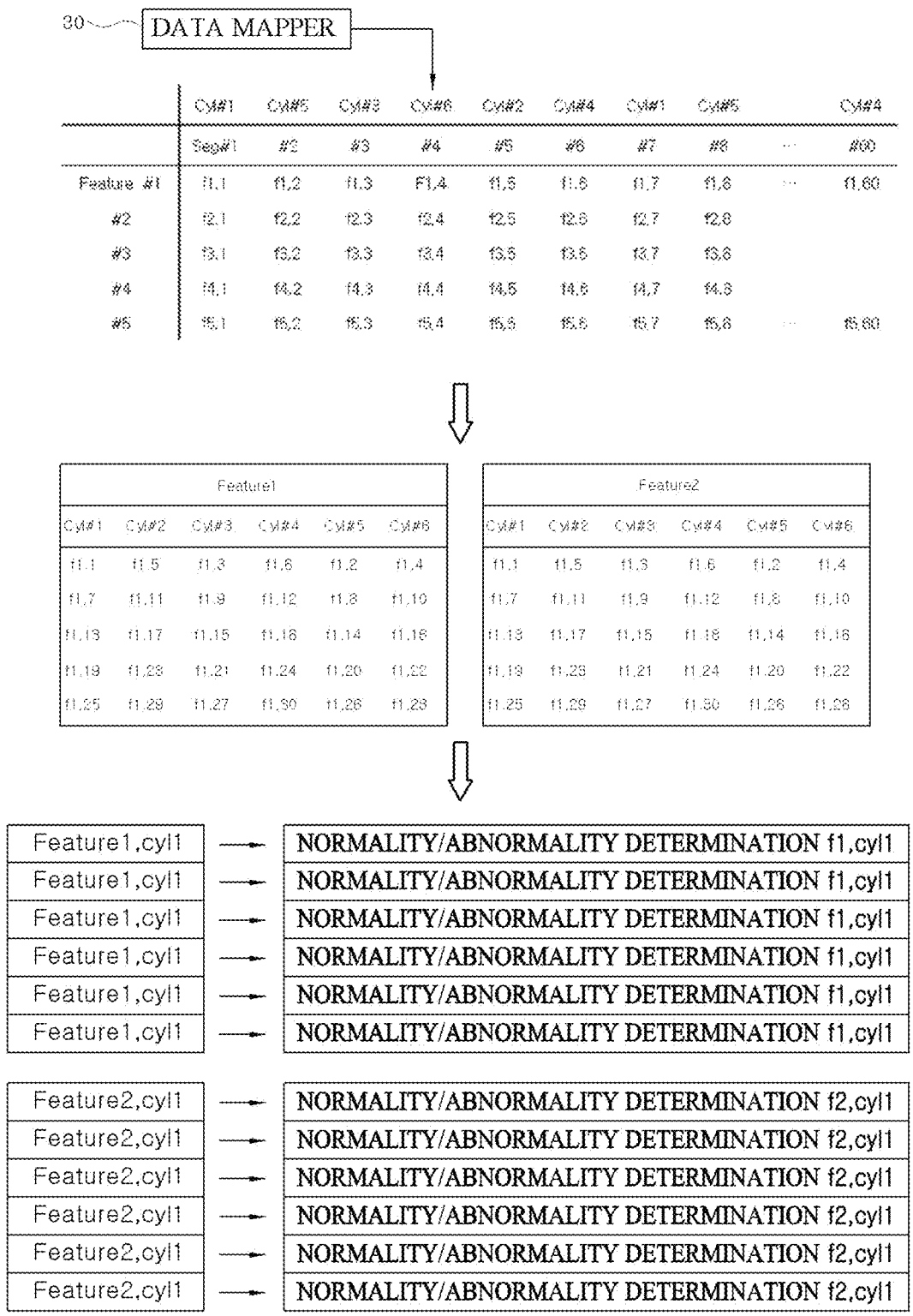
FIG. 9 is a diagram illustrating an example of a method for utilizing a data mapper in which the abnormality diagnosis for each cylinder is performed with normality/abnormality determination thresholds for each cylinder set for the feature vector aligned for each cylinder according to the present disclosure.

Referring to FIG. 9, the controller 10 is interlocked with the data mapper 30 through the diagnosis result determination unit 15.

As an example, the matching of the feature vector with the cylinder (S200-2) transfers n×100 or more (n is an integer of 1 or more) (for example, 300 (N×n)) feature vectors which may be diagnosed in the feature vector extraction unit 14 according to the applying of the data mapping (S200-1) as the input of the data mapper 30, and the data mapper 30 maps the time series sorting state for the n×100 or more feature vectors which may be diagnosed with the sorting state for each cylinder.

As an example, the constructing of the threshold correspondence result table (S220-1) assigns the vector threshold for each cylinder to the sorting state for each cylinder for the n×100 or more feature vectors which may be diagnosed to form a feature-cylinder matching table.

As an example, the confirming of the abnormal injector (S250) confirms the cylinder exceeding the vector threshold in the feature-cylinder matching table as the abnormal injector in the diagnosis result determination unit 15. The generating of the diagnosis result signal (S260) distinguishes the normal injector and the abnormal injector from the injectors #1 to #6 corresponding to the cylinders #1 to #6 in the diagnosis result determination unit 15, stores the abnormal injector in the On Board Diagnosis (OBD), and outputs it to the diagnosis lamp 9.

Referring to FIG. 3, the controller 10 turns on the diagnosis lamp 9 with the abnormal injector # signal or the normal injector # signal with respect to the output of the diagnosis result of the diagnosis result determination unit 15 to notify the driver or the inspector of the abnormal injector result.

As described above, the injector abnormal cylinder diagnosis method based on the signal deviation of the injector abnormality diagnosis system 1 according to the present exemplary embodiment measures, the controller 10, the noise/vibration signals due to the combustion of the engine 2, separates the injector abnormal frequency band signal from the noise/vibration signals as the injector signal, divides the cylinder number time series data, in which the signal maximum value among the noise/vibration signals is set as the cylinder #1, into the segments, confirms the segment number of the cylinder #1 with the vibration reduction signal of the noise/vibration signals, which are re-measured by setting one of the cylinders as the idle cylinder, to sort it with the injector causing vibration time series data, and then extracts the feature vector.

Particularly, by confirming the abnormal injector with the result of processing the feature vector based on the artificial intelligence (AI) or confirming the abnormal injector with the result of processing the feature vector based on the threshold, it is possible to independently diagnose whether the injector for each cylinder is normal or abnormal in consideration of the deviation of the noise/vibration signals between the injectors for each cylinder from the measured noise and vibration signals, and particularly, by performing the abnormality diagnosis for each of the injectors independently and accurately, it is possible to selectively replace the abnormal injector upon the engine inspection to reduce the A/S cost together while satisfying the customer service.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. An injector abnormal cylinder diagnosis method, the method comprising:
   separating, by a controller, an injector signal with respect to an injector abnormal frequency band signal indicating abnormality of an injector from noise or vibration signals due to the combustion of an engine;
   dividing cylinder number time series data, which uses a signal maximum value of the noise or vibration signals as a cylinder #1, into segments, and sorting injector causing vibration time series data by confirming a segment number using, as the cylinder #1, a vibration reduction signal of the noise/vibration signals measured in one idle cylinder state;
   extracting a feature vector with respect to each of the segments sorted by the injector causing vibration time series data; and
   confirming an abnormal injector by processing the feature vector based on artificial intelligence (AI), or confirming the abnormal injector by processing the feature vector based on a threshold.

2. The method of claim 1, wherein the noise or vibration signals are measured by an accelerometer.

3. The method of claim 1, wherein the separating of the injector signal comprises:
   measuring the noise or vibration signals;
   confirming the injector abnormal frequency band signal using the noise or vibration signals as raw data; and
   separating an injector signal indicating the abnormality of the injector by a filter processing.

4. The method of claim 1, wherein the sorting of the injector causing vibration time series data comprises:
   confirming the signal maximum value as a maximum value among signal magnitude values of the noise or vibration signals;
   confirming the number of cylinders of the engine;
   dividing the cylinder number time series data into the segments using, as a cylinder #1, a cylinder in which the signal maximum value is generated, and sorting the segments; and
   confirming an idle cylinder-based number which confirms the segment number by assigning the idle cylinder in which the combustion causing vibration is reduced to the cylinder #1; or
   confirming a sensor-based number which confirms the segment number by assigning the idle cylinder to the cylinder #1 in which a minimum signal of a crankshaft signal or a camshaft signal is generated.

5. The method of claim 4, wherein the sorting of the segment comprises:
   setting a segment #1 by assigning a length of the segment to the signal maximum value;
   setting a second segment according to the number of cylinders by increasing the length of the segment; and
   assigning a cylinder number by setting the segment #1 and the second segment.

6. The method of claim 5, wherein the setting of the segment #1 is applied with ½ of the length of the segment.

7. The method of claim 4, wherein the confirming of the idle cylinder-based number comprises:
   setting the idle cylinder as the cylinder #1;
   deactivating the injector #1 of the idle cylinder;
   re-measuring the noise or vibration signals of the engine;
   sorting the re-measured noise or vibration signals with injector causing time series data;
   confirming a segment with a vibration minimum value among the injector causing time series data as the segment of the idle cylinder due to the reduction in the combustion causing vibration; and
   numbering the segment using, as the cylinder #1, a cylinder in which a combustion causing vibration acceleration minimum value is generated.

8. The method of claim 4, wherein the confirming of the sensor-based cylinder number comprises:
   confirming a signal strength magnitude for the crankshaft signal or the camshaft signal; and
   confirming the segment number using, as the cylinder #1, a cylinder in which a minimum signal strength applied as a reference point among the signal strength magnitudes is generated.

9. The method of claim 1, wherein the extracting of the feature vector comprises:
   dividing the segments into segment units;
   setting the number of feature vectors for the segment units; and
   applying an extracted feature vector as a feature vector for abnormality diagnosis by extracting the number of feature vectors.

10. The method of claim 9, wherein the number of feature vectors is evenly applied to a group of the segment units.

11. The method of claim 10, wherein the number of feature vectors is n×100 or more (n is an integer of 1 or more) which may be diagnosed.

12. The method of claim 9, wherein the extracting of the feature vector is performed by any one of a vibration maximum value, a root mean square (RMS), a variance, a peak-to-peak, a kurtosis, and a crest factor.

13. The method of claim 1, wherein the confirming of the AI-based abnormal injector comprises:
   constructing a Deep Neural Network (DNN) model by extracting the feature vector as the feature vector for the abnormality diagnosis, and using the feature vector for the abnormality diagnosis as an input in an AI system;
   performing the AI using Machine learning or Deep learning with respect to the DNN model;
   determining, by the controller, the improvement in the accuracy of the DNN model using the output of the DNN model as the result of the DNN model;
   confirming the abnormal injector from the result of the DNN model; and
   outputting the abnormal injector confirmation as a diagnosis result.

14. The method of claim 13, wherein the confirming of the AI-based abnormal injector comprises:
   re-constructing the Deep Neural Network (DNN) model by increasing the number of feature vectors for the abnormality diagnosis extracted in response to the demand for the improvement in the accuracy of the DNN model.

15. The method of claim 1, wherein the confirming of the threshold-based abnormal injector comprises:
   performing, by a data mapper, cylinder mapping by sorting the time series data of the feature vector for each cylinder;
   matching the threshold for each cylinder with the cylinder mapping result;
   confirming, by the controller, an abnormal injector from the threshold matching result; and
   outputting the abnormal injector confirmation as the diagnosis result.

16. An injector abnormality diagnosis system comprising:
   a controller configured to measure noise or vibration signals due to the combustion of an engine, separate an injector abnormal frequency band signal as an injector signal from the noise/vibration signals, divide cylinder number time series data, which use a signal maximum value of the noise or vibration signals as a cylinder #1, into segments, extract a feature vector after confirming a segment number of the cylinder #1 with a vibration reduction signal of the noise or vibration signals re-measured using one of the cylinders as an idle cylinder, and sort it by injector causing vibration time series data, and confirms an abnormal injector with the feature vector; and an accelerometer configured to measure the noise or vibration signals.

17. The injector abnormality diagnosis system of claim 16, wherein the accelerometer is attached to a location of a cylinder in which a highest signal-to-noise (S/N) ratio is measured in the engine.

18. The injector abnormality diagnosis system of claim 16, wherein the controller is connected to an artificial intelligence (AI) system, and wherein the artificial intelligence (AI) system transfers an abnormal injector processing result of processing the feature vector based on artificial intelligence (AI) to the controller.

19. The injector abnormality diagnosis system of claim 16, wherein the controller is connected to a data mapper, and wherein the data mapper transfers an abnormal injector processing result of processing the feature vector based on a threshold to the controller.

20. The injector failure diagnosis system of claim 16, wherein the controller comprises:
- a data processing unit configured to measure the noise or vibration signals;
- a frequency separation unit configured to separate the injector signal;
- a time series data sorting unit configured to divide segments;
- a feature vector extraction unit configured to extract the feature vector; and
- a diagnosis result determination unit configured to diagnose the failure injector.

* * * * *